US 011402045B2

(12) United States Patent
Paige et al.

(10) Patent No.: US 11,402,045 B2
(45) Date of Patent: Aug. 2, 2022

(54) PRESS FITTING ASSEMBLY

(71) Applicant: NIBCO INC., Elkhart, IN (US)

(72) Inventors: Ronald D Paige, Granger, IN (US);
Willis Mitchell, Granger, IN (US);
David A Bobo, Granger, IN (US)

(73) Assignee: NIBCO Inc., Elkhart, IN (US)

( * ) Notice: Subject to any disclaimer, the term of this patent is extended or adjusted under 35 U.S.C. 154(b) by 205 days.

(21) Appl. No.: 16/821,516

(22) Filed: Mar. 17, 2020

(65) Prior Publication Data

US 2020/0300395 A1 Sep. 24, 2020

Related U.S. Application Data

(60) Provisional application No. 62/821,108, filed on Mar. 20, 2019.

(51) Int. Cl.
| F16L 37/091 | (2006.01) |
| F16J 15/02 | (2006.01) |
| F16L 21/02 | (2006.01) |
| F16L 37/092 | (2006.01) |

(52) U.S. Cl.
CPC ........... *F16L 37/091* (2013.01); *F16J 15/022* (2013.01); *F16L 21/02* (2013.01); *F16L 37/0925* (2013.01)

(58) Field of Classification Search
CPC ......... F16L 13/142; F16L 17/06; F16L 21/02; F16L 21/03; F16L 21/08; F16L 37/091; F16L 37/0925; F16L 37/1235; F16L 37/088; H02G 3/065; H02G 3/22
USPC .................................................. 285/108, 374
See application file for complete search history.

(56) References Cited

U.S. PATENT DOCUMENTS

| 2,983,533 A | 5/1961 | Tisch |
| 3,472,523 A | 10/1969 | Rentschler et al. |
| 3,584,889 A | 6/1971 | Sheets |
| RE27,736 E | 8/1973 | Muhlner |
| 4,304,415 A | 12/1981 | Wolf et al. |
| 4,368,894 A | 1/1983 | Parmann |
| 4,586,734 A | 5/1986 | Grenier |

(Continued)

FOREIGN PATENT DOCUMENTS

| CA | 3115847 A1 | 4/2020 |
| DE | 20310212 | 11/2004 |

(Continued)

OTHER PUBLICATIONS

Canadian Intellectual Property Office, First Office Action for Canadian Patent Application No. 3,076,338, dated Sep. 24, 2021, 4 pages.

*Primary Examiner* — Aaron M Dunwoody
(74) *Attorney, Agent, or Firm* — Price Heneveld LLP

(57) ABSTRACT

A press fitting assembly is provided that includes: a piping component including a receiving device which includes an open end and a shoulder, the open end comprising a continuous stop; a grip ring positioned within the receiving device abutting the continuous stop and comprising a plurality of opposing teeth; a sealing element positioned within the receiving device and abutting the shoulder, wherein the sealing element comprises at least one lobe; and a separator ring positioned within the receiving device between the sealing element and the grip ring, the ring comprises a base portion and an angled portion. Further, the angled portion is angled toward the sealing element and the shoulder.

20 Claims, 11 Drawing Sheets

(56) References Cited

U.S. PATENT DOCUMENTS

| | | |
|---|---|---|
| 5,692,758 A | 12/1997 | Wikstrom |
| 6,843,516 B2 | 1/2005 | Bishop et al. |
| 6,913,292 B2 | 7/2005 | Snyder, Sr. et al. |
| 7,007,954 B2 | 3/2006 | Travers |
| 7,121,593 B2 | 10/2006 | Snyder, Sr. et al. |
| 7,316,429 B2 | 1/2008 | Viegener |
| 7,475,918 B2 | 1/2009 | Kaimer et al. |
| 7,823,932 B2 | 11/2010 | Webb et al. |
| 7,891,711 B2 | 2/2011 | Song |
| 8,517,431 B2 | 8/2013 | Arning et al. |
| 8,585,100 B2 | 11/2013 | Stults et al. |
| 8,801,048 B2 | 8/2014 | Morris et al. |
| 9,182,061 B2 | 11/2015 | Hamaguchi et al. |
| 9,188,260 B2 | 11/2015 | Spence |
| 9,234,611 B2 | 1/2016 | Arning et al. |
| 9,551,445 B2 | 1/2017 | Morse et al. |
| 9,638,360 B2 | 5/2017 | Jamison et al. |
| 9,664,316 B1* | 5/2017 | Crompton ............. F16L 13/142 |
| 9,791,078 B2 | 10/2017 | Lee |
| 9,800,030 B2 | 10/2017 | Morse et al. |
| 9,851,028 B2 | 12/2017 | Stout et al. |
| 10,330,231 B2 | 6/2019 | Meissner |
| 2004/0239115 A1 | 12/2004 | Wilk, Jr. et al. |
| 2011/0285094 A1 | 11/2011 | Henry |
| 2019/0024827 A1* | 1/2019 | Ruissen ................ F16L 13/142 |
| 2019/0067922 A1* | 2/2019 | Platt ...................... F16L 13/142 |
| 2019/0170277 A1 | 6/2019 | Kost et al. |

FOREIGN PATENT DOCUMENTS

| | | |
|---|---|---|
| DE | 202005009254 | 10/2005 |
| DE | 102004044226 | 12/2005 |
| DE | 102016106624 | 10/2017 |
| EP | 3412953 A1 | 12/2018 |

* cited by examiner

PRESS FITTING ASSEMBLY

CROSS-REFERENCE TO RELATED APPLICATIONS

This patent application claims priority under 35 U.S.C. § 119(e) to U.S. Provisional Patent Application No. 62/821,108, entitled PRESS FITTING ASSEMBLY, filed Mar. 20, 2019, the entire disclosure of which is incorporated herein by reference.

FIELD

The present disclosure generally relates to a press fitting assembly, and more particularly, a press fitting assembly, e.g., a coupling, an adapter, a valve, etc., that includes a grip ring and sealing element.

BACKGROUND OF THE INVENTION

Over the years, the plumbing industry has witnessed a remarkable increase in the use of mechanical joinery systems as alternatives to traditional threaded connections (e.g., as-manufactured fittings with threaded ends joined by threading) and thermal connections (e.g., connections made by brazing, soldering and/or welding). Further, within the general family of mechanical joinery, 'press' joint connections, as understood by those in the field of this disclosure, are finding use in or are being considered for application.

'Press' mechanical joinery includes interlocking devices such as sleeves that aid in affixing mating tubular members. The purpose of these interlocking devices is to mechanically grip the inserted tube, increasing joint slip resistance. However, when 'press' mechanical joinery is employed in actual use, uneven stress associated with the application of the press and/or hoop stress associated with service may cause the joinery to fail, even when a conventional sleeve is holding the tube of the joinery in place.

Accordingly, there is a need for interlocking devices configured for mechanical joinery, including connection sockets of tubular connections (e.g., piping connections) and piping components (e.g., valve assemblies), to include features that provide additional gripping of a pipe within the connection socket.

SUMMARY OF THE INVENTION

According to an aspect of the present disclosure, a press fitting assembly is provided that includes: a piping component including a receiving device which includes an open end and a shoulder, the open end comprising a continuous stop. The press fitting assembly also includes a grip ring positioned within the receiving device abutting the continuous stop, wherein the grip ring comprises a plurality of opposing teeth; a sealing element positioned within the receiving device and abutting the shoulder, wherein the sealing element comprises at least one lobe; and a separator ring positioned within the receiving device between the sealing element and the grip ring, wherein the separator ring comprises a base portion and an angled portion. Further, the angled portion is angled toward the sealing element and the shoulder.

According to another aspect of the present disclosure, a press fitting assembly is provided that includes: a piping component including a receiving device which comprises an open end and first and second shoulders, wherein the open end comprises a continuous stop with the continuous stop and the first shoulder forming a receiving space; a grip ring positioned within the receiving space and proximate the continuous stop, wherein the grip ring comprises a plurality of opposing teeth, and each of the plurality of opposing teeth has an angled tip; a sealing element positioned within the receiving space and proximate the grip ring, the sealing element comprising at least one lobe; and a separator ring positioned between the sealing element and the grip ring. The receiving device and the second shoulder are configured to receive a pipe which abuts against the second shoulder.

According to a further aspect of the present disclosure, a press fitting assembly is provided that includes: a piping component including a receiving device which comprises an open end and a shoulder; a grip ring positioned within the receiving device between the open end and the shoulder, the grip ring comprising a plurality of teeth extending toward a center of the grip ring, wherein the plurality of teeth of the grip ring are arranged in a first row of teeth and a second row of teeth; a sealing element positioned proximate the grip ring, wherein the sealing element comprises at least one lobe; and a separator ring positioned between the sealing element and the grip ring, wherein the separator ring includes a first portion and a second portion positioned at an angle between about 125° to about 175° relative to the first portion. Further, the receiving device is configured to receive a pipe.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
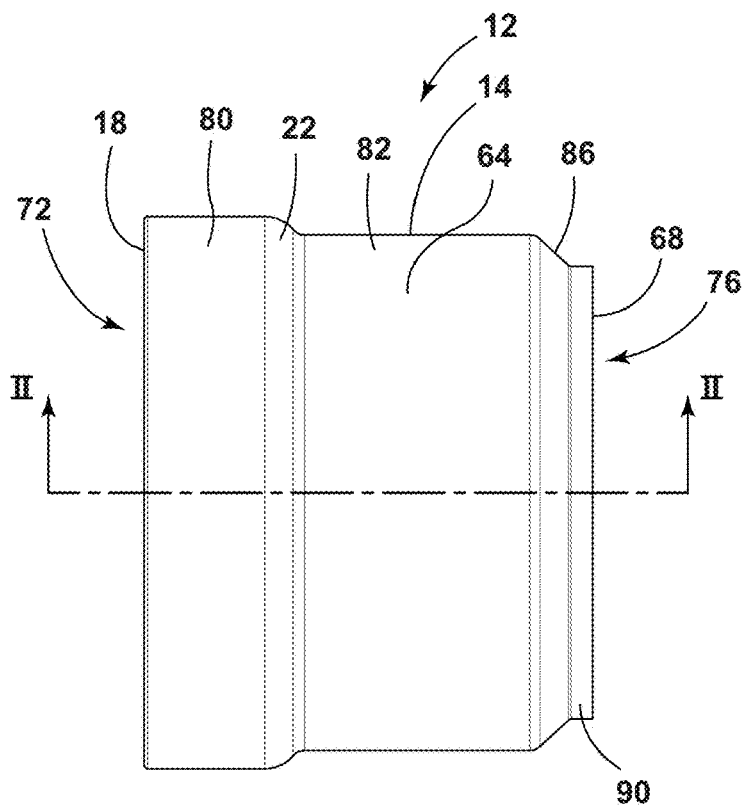
FIG. 1 is a side profile view of a receiving device of a coupling, according to various examples.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

The following disclosure generally describes a receiving device for a press fitting assembly that may be configured to receive a pipe. The receiving device may be a component of any piping component, e.g., a coupling, an adapter, a valve, etc., that includes a body having an open end. A receiving space is defined by a shoulder of the receiving device and a continuous stop positioned about a periphery of the open end. A grip ring may be positioned within the receiving space proximate the continuous stop. The grip ring may include a plurality of opposing teeth positioned about a plurality of openings defined by the grip ring. The plurality of opposing teeth extend from the grip ring toward a centerline of the receiving device. Similarly, a sealing element may be positioned within the receiving space proximate the shoulder. A separator ring may be positioned between the grip ring and the sealing element. The separator ring may include a first portion and a second portion where the second portion is positioned at an angle relative to the first portion. The continuous stop and the shoulder provide boundaries for the grip ring, the sealing element, and the separator ring, retaining the grip ring, the sealing element, and separator ring within the receiving space.

As detailed in the disclosure, the use of the grip ring, sealing element, and separator ring within the receiving device are advantageous when pressing the receiving device for joinery. For example, the plurality of opposing teeth of the grip ring include angled tips configured to bite into an outer surface of a pipe when the receiving device is pressed. Where the plurality of opposing teeth are offset, the plurality of opposing teeth may provide a continuous ring of teeth for improved grip when pressed. The sealing element is configured to form a seal about the outer surface of the pipe when the receiving device is pressed. The separator ring is positioned to prevent the sealing element from being displaced during pressing, preventing the plurality of teeth of the grip ring from damaging the sealing element and compromising the seal. The separator ring may include a first portion and a second portion, where the second portion is positioned at an angle. In some examples, the second portion may wrap around the sealing element, further shielding the sealing element from the plurality of teeth of the grip ring and preventing inadvertent displacement of the sealing element.

In the disclosure, and depicted in exemplary form in FIGS. 1-12A, a press fitting assembly 10 may be provided that includes a receiving device 14, 214, 314 having a first open end 18, 218, 318 and a first shoulder 22, 222, 322. The first open end 18, 218, 318 may include a continuous stop 26, 226, 326. A grip ring 30 may be positioned within the receiving device 14, 214, 314 abutting the continuous stop 26. The grip ring 30 may comprise a plurality of opposing teeth 34. A sealing element 38 may be positioned within the receiving device 14, 214, 314 and may abut the first shoulder 22, 222, 322. The sealing element 38 may comprise one or more lobes 42 (e.g., one lobe 42, a pair of lobes 42, etc.). A separator ring 46 may be positioned within the receiving device 14, 214, 314 between the sealing element 38 and the grip ring 30. The separator ring 46 may comprise a base portion 50 and an angled portion 52. The angled portion 52 may be angled toward the sealing element 38 and the first shoulder 22, 222, 322. In other embodiments, the separator ring 46 may have a substantially square, circular, or elliptical cross section (not shown).

Figure 2:
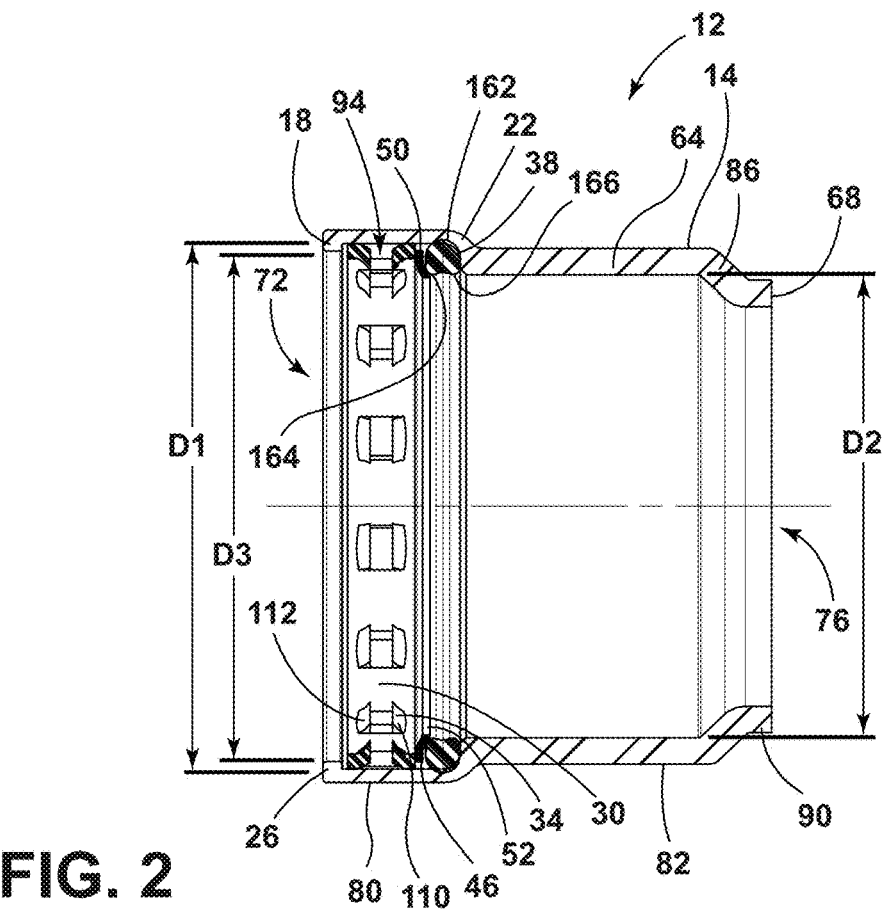
FIG. 2 is a cross-sectional view taken at line II-II of the receiving device of FIG. 1.

Referring to FIGS. 1 and 2, an exemplary depiction of the receiving device 14 is shown where the piping component is a coupling 12. The receiving device 14 may be fabricated from any material including, but not limited to, steel, iron, brass, copper, nickel, aluminum, or any other alloy. The receiving device 14 includes a body 64 extending between the first open end 18 and a second open end 68. In various examples, the first open end 18 may serve as an inlet and may define a first opening 72. Similarly, the second open end 68 may serve as an outlet and define a second opening 76. According to various examples, the first and second openings 72, 76 may have the same diameter. In other examples, the first and second openings 72, 76 may have varying diameters.

According to various examples, the body 64 of the receiving device 14 may include a first portion 80 integrally formed with a second portion 82. The first portion 80 may have a first inner diameter D1. The second portion 82 may have a second inner diameter D2, wherein the second inner diameter D2 is less than the first inner diameter D1. In other examples, the body 64 of the receiving device 14 may include a single portion having a continuous diameter. In still other examples, the body 64 of the receiving device 14 may have a plurality of portions having various diameters.

The receiving device 14 may include the first shoulder 22 and a second shoulder 86. Each of the first and second shoulders 22, 86 may be shaped and positioned to act as stops within the receiving device 14. The first shoulder 22 may be positioned between the first open end 18 and the second open end 68 of the body 64 of the receiving device 14. The first shoulder 22 may extend from the second portion 82 of the body 64 of the receiving device 14 to the first portion 80 of the body 64 of the receiving device 14. In various examples, the first shoulder 22 may be tapered to accommodate the variation in diameter between the first and second portions 80, 82 of the body 64 of the receiving device 14. In other examples, the first shoulder 22 may be a step to accommodate the variation in diameter between the first and second portions 80, 82 of the body 64 of the receiving device 14.

Referring again to the receiving device 14 shown in FIGS. 1 and 2, the second shoulder 86 may be positioned proximate the second open end 68. In various examples, the second shoulder 86 may extend about the periphery of the second open end 68. The second shoulder 86 may be tapered to extend outward from the second open end 68 and towards the second portion 82 of the body 64 of the receiving device 14. In other examples, the second shoulder 86 may extend between a lip 90 and the second portion 82 of the body 64 of the receiving device 14. In some embodiments, the receiving device 14 includes only the first shoulder 22.

As noted earlier, the receiving device 14 includes a continuous stop 26. The continuous stop 26 may extend about the periphery of the first open end 18 inward toward a centerline of the receiving device 14. The continuous stop 26 and the first shoulder 22 may define a receiving space 94 within the first portion 80 of the body 64 of the receiving device 14. The continuous stop 26 may have a cross-sectional shape that is circular, triangular, square, or rectangular or that is shaped as any other higher-order polygon. The continuous stop 26 may define the first opening 72 of the first open end 18. The first opening 72 may have a diameter D3 that is substantially equal to or greater than the inner diameter D2 of the second portion 82 of the body 64 of the receiving device 14. The first opening 72 may be sized such that the continuous stop 26 abuts a pipe 60 when the pipe 60 is inserted within the receiving device 14 (see FIG. 6).

Figure 3:
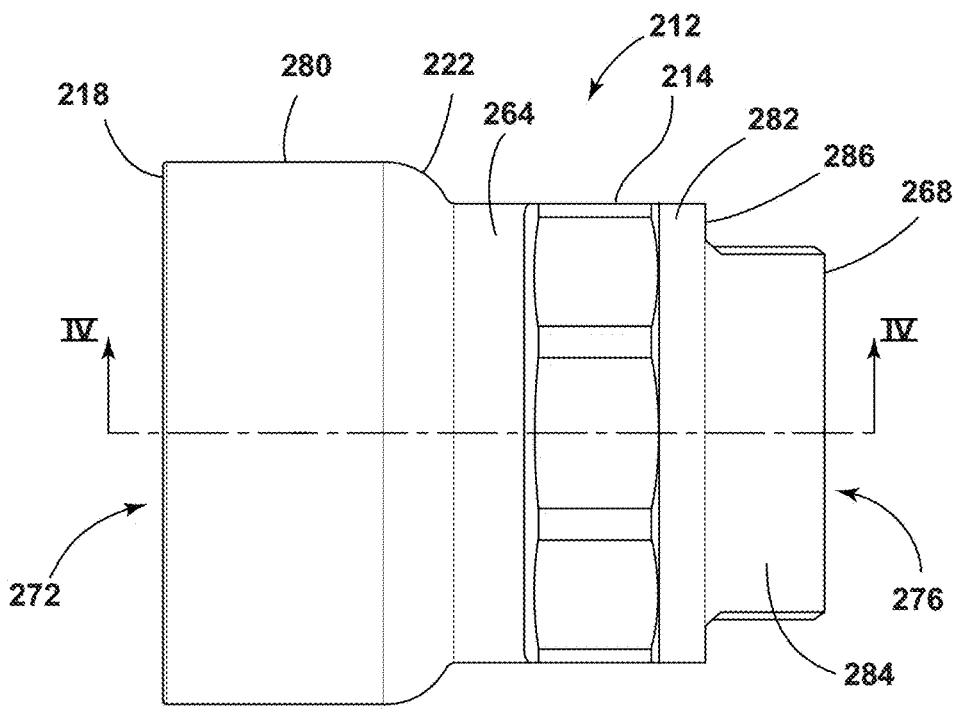
FIG. 3 is a side profile view of a receiving device of an adapter, according to various examples.
Figure 4:
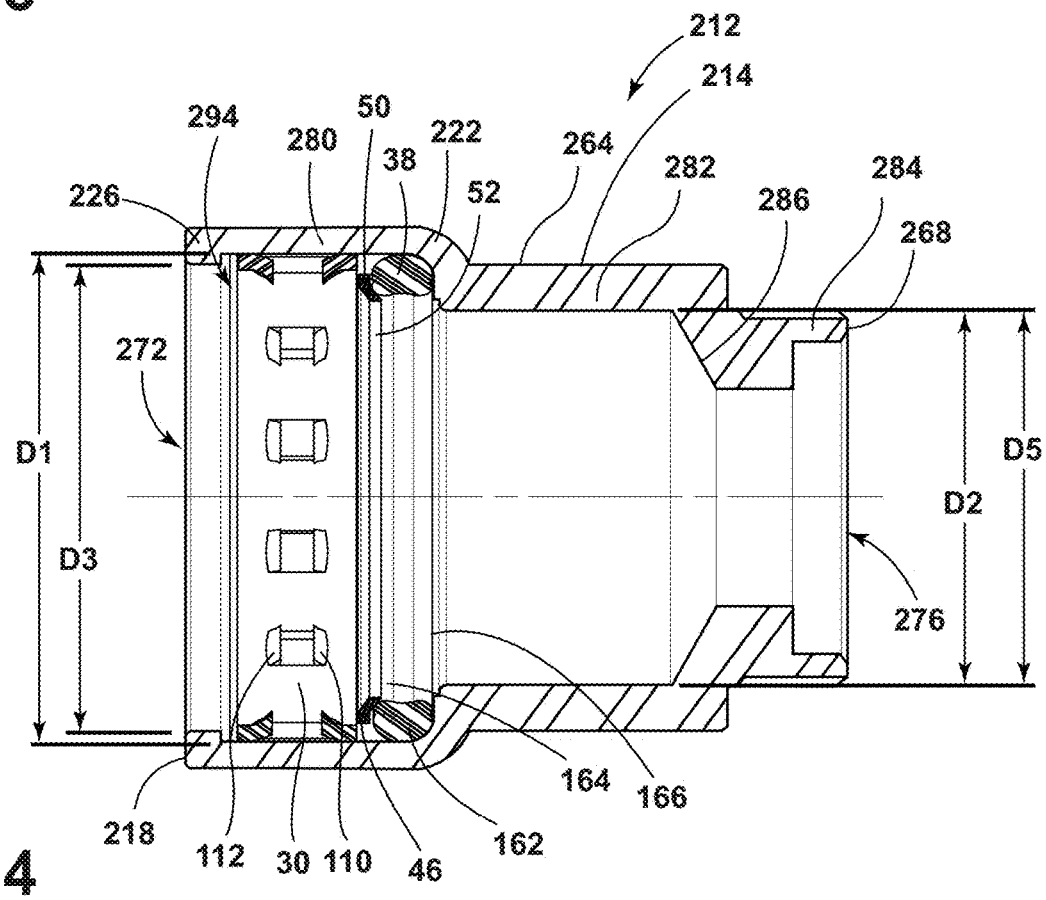
FIG. 4 is a cross-sectional view taken at line IV-IV of the receiving device of FIG. 3.

Referring now to FIGS. 3 and 4, another exemplary depiction of a receiving device 214 is shown where the piping component is an adapter 212. The adapter 212 may be any adapter such as, for example, an expansion adapter, a joint adapter, a bell adapter, or a flange adapter. The receiving device 214 is similar to the receiving device 14 (see FIGS. 1 and 2) and like-numbered elements have the same or substantially similar functions and structures. Like the receiving device 14 of FIGS. 1 and 2, the receiving device 214 may be fabricated from any material including, but not limited to, steel, iron, brass, copper, nickel, aluminum, or any other alloy. The receiving device 214 includes a body 264 extending between the first open end 218 and a second open end 268. In various examples, the first open end 218 may define a first opening 272, and the second open end 268 may define a second opening 276. According to various examples, the first and second openings 272, 276 may have the same diameter. In other examples, the first and second openings 272, 276 may have varying diameters.

The body 264 of the receiving device 214 may include a first portion 280 integrally formed with a second portion 282. A connector portion 284 may extend from the second portion 282 opposite the first portion 280 and includes the second open end 268. The first and second portions 280, 282 may have first and second inner diameters D1, D2 that are substantially the same or different. The connector portion 284 may have an outer diameter D5 that is less than or the same as one or both of the first and second inner diameters D1, D2. It will be understood that any number and/or combination of portions may be used with each portion having the same diameter or differing diameters.

The receiving device 214 includes at least the first shoulder 222 and a second shoulder 286. Each of the first and second shoulders 222, 286 may be shaped and positioned to act as stops within the receiving device 214. The receiving device 214 further includes the continuous stop 226 that extends about a periphery of the first open end 218. The continuous stop 226 and the first shoulder 222 may define a receiving space 294 within the first portion 280 of the body 264 of the receiving device 214. The receiving space 294 is in communication with the first opening 272 of the first open end 218. The first opening 272 may have a diameter D3 that is substantially equal to or greater than the inner diameter D2 of the second portion 282 of the body 264 and may be configured to receive the pipe 60, as discussed below and illustrated in FIG. 6.

Figure 5:
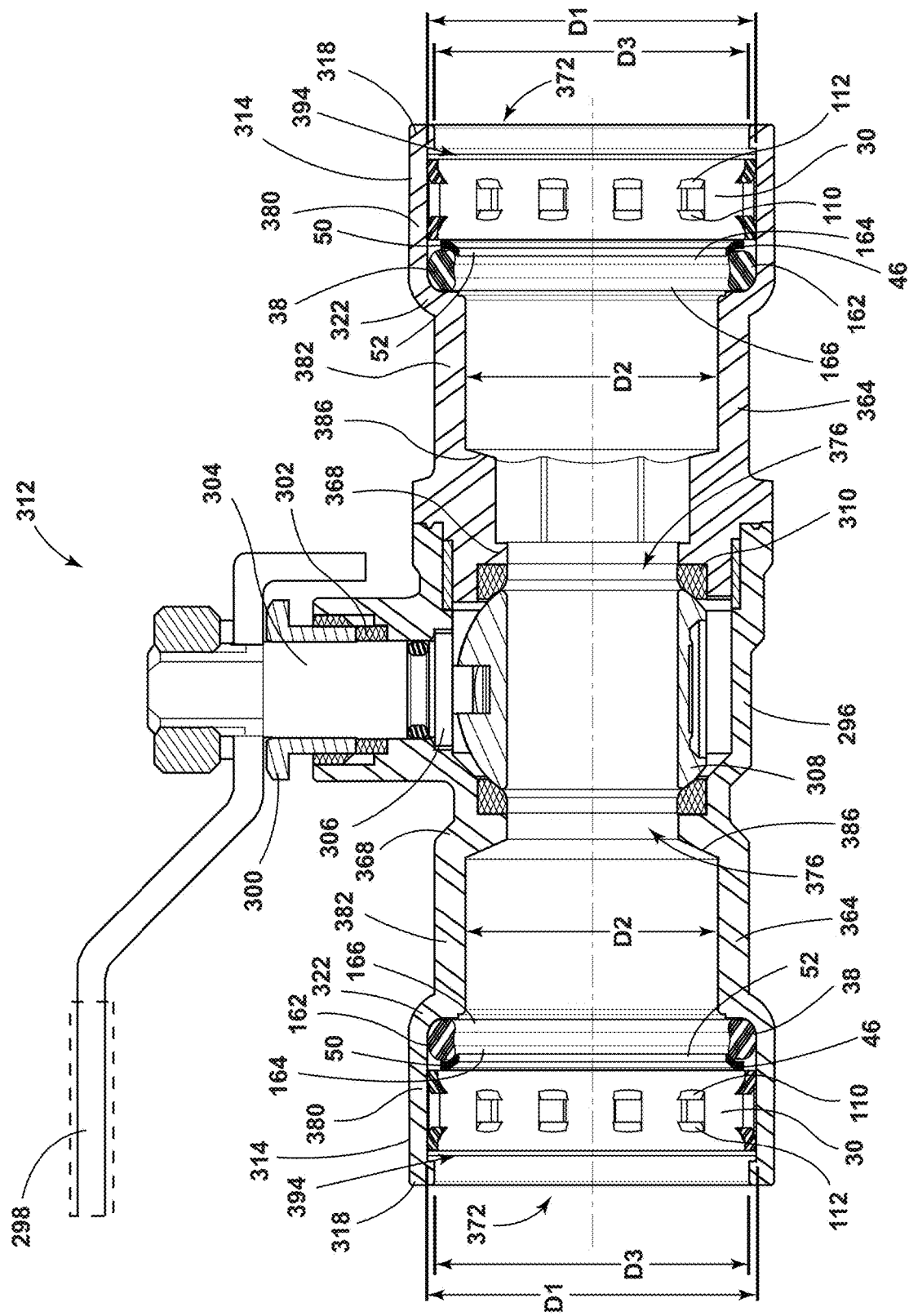
FIG. 5 is a cross-sectional view of a receiving device of a valve, according to various examples.

Referring now to FIG. 5, another exemplary depiction of a receiving device 314 is shown where the piping component is a valve 312. The receiving device 314 is similar to the receiving devices 14, 214 (see FIGS. 1-4) and like-numbered elements have the same or substantially similar functions and structures. The valve 312 may be any valve without departing from the scope of the present disclosure. For example, the valve 312 may be a gate valve, a plug valve, or a ball valve. The valve 312 may include standard valve components including, but not limited to, a handle 298, a threaded pack gland 300, a packing 302, a stem 304, a thrust washer 306, a vented ball 308, and a seat ring 310. The components are conventionally arranged within the valve 312 and function as known in the field of this disclosure.

The valve 312 includes a valve body 296 coupled with the receiving device 314. As illustrated in FIG. 5, the valve 312 may include more than one receiving device 314. For example, the receiving device 314 may be positioned on one side of the valve body 296 or may be one of a pair of receiving devices 314 extending from either side of the valve body 296. The receiving device 314 may be integrally formed with the valve body 296 or may be coupled with the valve body 296. Like the receiving devices 14, 214 of FIGS. 1-4, the receiving device 314 may be fabricated from any material including, but not limited to, steel, iron, brass, copper, nickel, aluminum, or any other alloy. Further, any other component of the valve 312 may be fabricated from the same material as the receiving device 314 or may be fabricated from a different material without departing from the scope of the present disclosure.

The receiving device 314 includes a body 364 that extends between the first open end 318 and a second open end 368 coupled with the valve body 296. The first open end 318 may define a first opening 372, and the second open end 368 may define a second opening 376. According to various examples, the first and second openings 372, 376 may have the same or different diameters. The body 364 may include a first portion 380 integrally formed with a second portion 382 and defining a receiving space 394. The first portion 380 is positioned proximate the first open end 318, and the second portion 382 is positioned between the first portion 380 and the second open end 368. The first and second portions 380, 382 may have first and second inner diameters D1, D2 that may be substantially equal or the first and second inner diameters D1, D2 may differ in dimension. It will be understood that any number and/or combination of portions may be used with each portion having the same diameter or differing diameters.

The receiving device 314 includes at least a first shoulder 322, a second shoulder 386, and a continuous stop 326. The continuous stop 326 extends about a periphery of the first open end 318 and at least partially encloses the receiving space 394 of the first portion 380. The receiving space 394 is in communication with the first opening 372 of the first open end 318. The first opening 372 may have a diameter D3 that is substantially equal to or greater than the inner diameter D2 of the second portion 382 of the body 364 and may be configured to receive the pipe 60, as discussed below and illustrated in FIG. 6.

Figure 6:
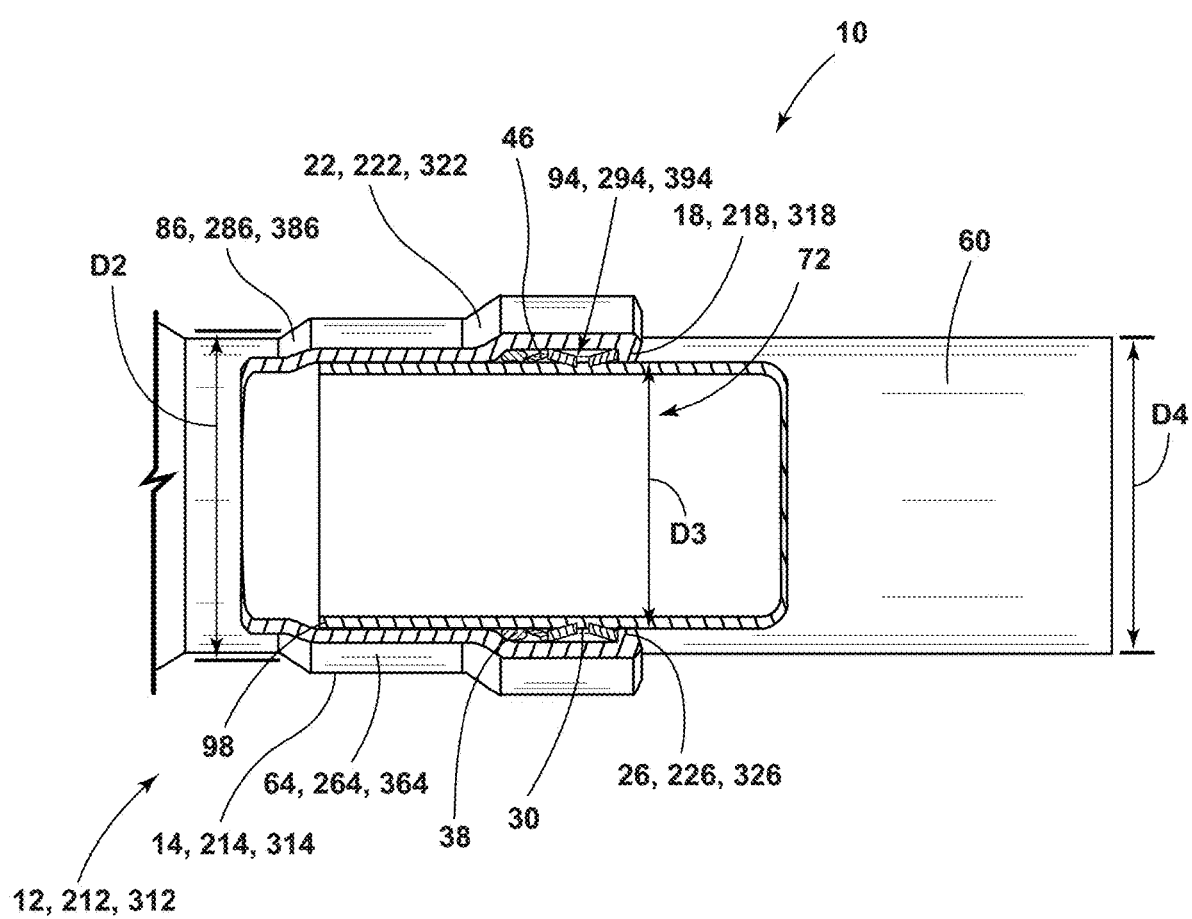
FIG. 6 is a side profile view of a press fitting assembly, according to various examples.

Referring now to FIGS. 1-6, the press fitting assembly 10 is shown in exemplary form including the pipe 60 configured to be received by the receiving device 14, 214, 314. FIG. 6 illustrates an exemplary receiving device that is understood to be any one of the receiving devices 14, 214, 314 of the coupling 12, the adapter 212, and the valve 312 or any other piping component. The pipe 60 may be fabricated of any material including, but not limited to, steel, iron, brass, copper, nickel, aluminum, polyvinyl chloride, or any other alloy or polymer. The pipe 60 is positioned through the first opening 72, 272, 372 of the first open end 18, 218, 318. The pipe 60 may be positioned within the receiving device 14, 214, 314 of the press fitting assembly 10 such that a first end 98 of the pipe 60 abuts a portion of the first shoulder 22, 222, 322 or the second shoulder 86, 286, 386 of the receiving device 14, 214, 314. An outer diameter D4 of the pipe 60 may be sized such that the pipe 60 may be received by the first opening 72, 272, 372 of the receiving device 14, 214, 314. In various examples, the outer diameter D4 of the pipe 60 may be sized such that the pipe 60 forms an interference fit within the inner diameter D2 of the second portion 82, 282, 382 of the body 64, 264, 364 of the receiving device 14, 214, 314. In other examples, the outer diameter D4 may be sized to be less than the inner diameter D2 of the second portion 82, 282, 382 of the body 64, 264, 364 of the receiving device 14, 214, 314.

Referring now to FIGS. 1-6, the grip ring 30, the sealing element 38, and the separator ring 46 are positioned within the receiving space 94, 294, 394 of the body 64, 264, 364 of the receiving device 14, 214, 314. The grip ring 30 is positioned to abut the continuous stop 26, 226, 326, according to various examples. In other examples, the grip ring 30 may be positioned proximate the continuous stop 26, 226, 326 without abutting the continuous stop 26, 226, 326. The grip ring 30 may include various configurations where each configuration includes one of various patterns of the plurality of opposing teeth 34, as discussed in more detail below.

Referring again to FIGS. 1-6, the continuous stop 26, 226, 326, the grip ring 30, the sealing element 38, and the separator ring 46 work together to provide a seal between the receiving device 14, 214, 314 and the pipe 60. The continuous stop 26, 226, 326 is sized to receive the pipe 60. In various examples, the continuous stop 26, 226, 326 may form an interference fit with the pipe 60 when the receiving device 14, 214, 314 is pressed. In other words, the diameter D4 of the pipe 60 may be sized so that the pipe 60 forms an interference fit within the diameter D3 of the first opening 72, 272, 372 defined by the continuous stop 26, 226, 326. In other examples, the diameter D3 of the first opening 72, 272, 372 defined by the continuous stop 26, 226, 326 may be greater than the outer diameter D4 of the pipe 60.

Still referring to FIGS. 1-6, as discussed in more detail below, the grip ring 30 includes the plurality of opposing teeth 34 extending inward toward the centerline of the receiving device 14, 214, 314. The plurality of opposing teeth 34 may be spaced apart to define an inner diameter of the grip ring 30 that is configured to engage in an interference fit with the outer surface of the pipe 60. Alternatively, the plurality of opposing teeth 34 may be spaced apart such that the inner diameter of the grip ring 30 is greater than the outer diameter D4 of the pipe 60. When pressing occurs, the plurality of opposing teeth 34 may be pressed into the outer surface of the pipe 60 to hold the pipe 60 within the receiving device 14, 214, 314 (see FIG. 6). Similarly, the sealing element 38 may be sized to form an interference fit with the outer surface of the pipe 60. The sealing element 38 provides an interior seal to prevent leakage between the receiving device 14, 214, 314 and the outer surface of the pipe 60. In other examples, the sealing element 38 may form an interference fit with the outer surface of the pipe 60 after pressing occurs. As previously discussed, the separator ring 46 prevents damage of the sealing element 38 by the plurality of opposing teeth 34 of the grip ring 30 when the receiving device 14, 214, 314 is pressed, preserving the interior seal between the receiving device 14, 214, 314 and the pipe 60.

Referring now to FIGS. 7-10B, the grip ring 30 includes a body 100 extending circumferentially from a first end 102 to a second end 104. The first and second ends 102, 104 of the body 100 may define a gap 108. The grip ring 30 may be formed of stainless steel metal, or any other metal or material, and may be compressible such that the first and second ends 102, 104 of the body 100 of the grip ring 30 may be compressed to reduce the gap 108 to facilitate insertion of the grip ring 30 within the receiving device 14, 214, 314 (see FIGS. 1-6). The gap 108 may be spaced such that an arc C passing through the gap 108 measures about 40° to about 20°, about 30°, or any value or range of values therebetween.

The plurality of opposing teeth 34 of the grip ring 30 may be arranged in a first row of teeth 110 and a second row of teeth 112. Each of the first row of teeth 110 and each of the second row of teeth 112 may be combined to form pairs of teeth 116. Each of the plurality of opposing teeth 34 extends from the body 100 of the grip ring 30 toward a center of the grip ring 30. Each of the plurality of opposing teeth 34 may include an angled tip 120. According to various examples, each of the plurality of opposing teeth 34 may have a triangular cross-section with a base of the cross-section parallel with an inner surface 124 of the body 100 of the grip ring 30 and with the other two sides of the cross-section forming the angled tip 120. The angled tips 120 may be configured to facilitate gripping of the pipe 60, as shown in FIG. 6.

Figure 7:
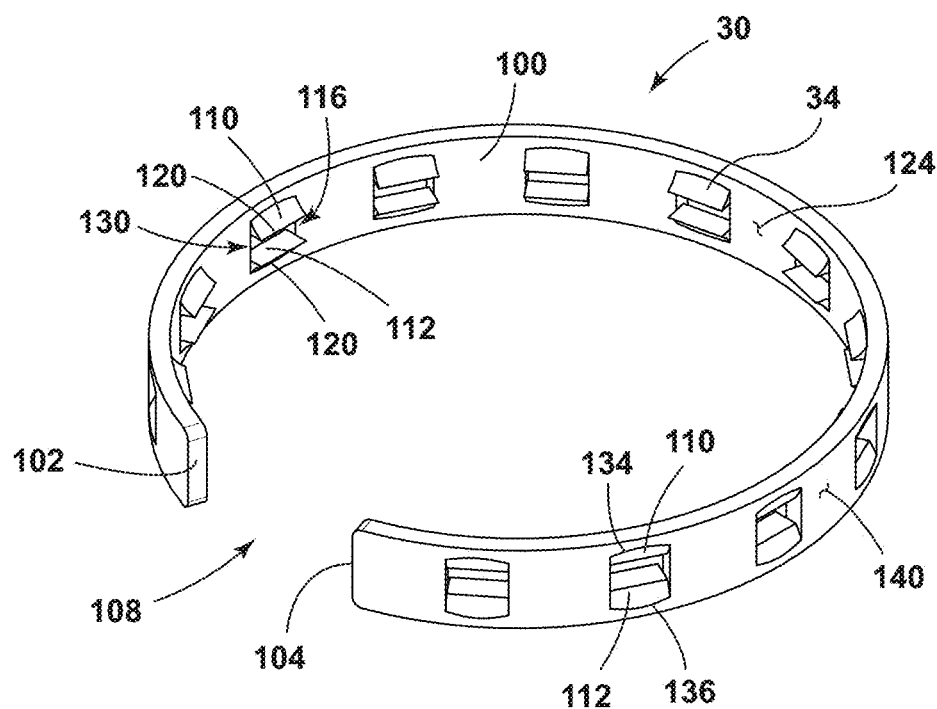
FIG. 7 is a perspective view of a grip ring, according to various examples.
Figure 8:
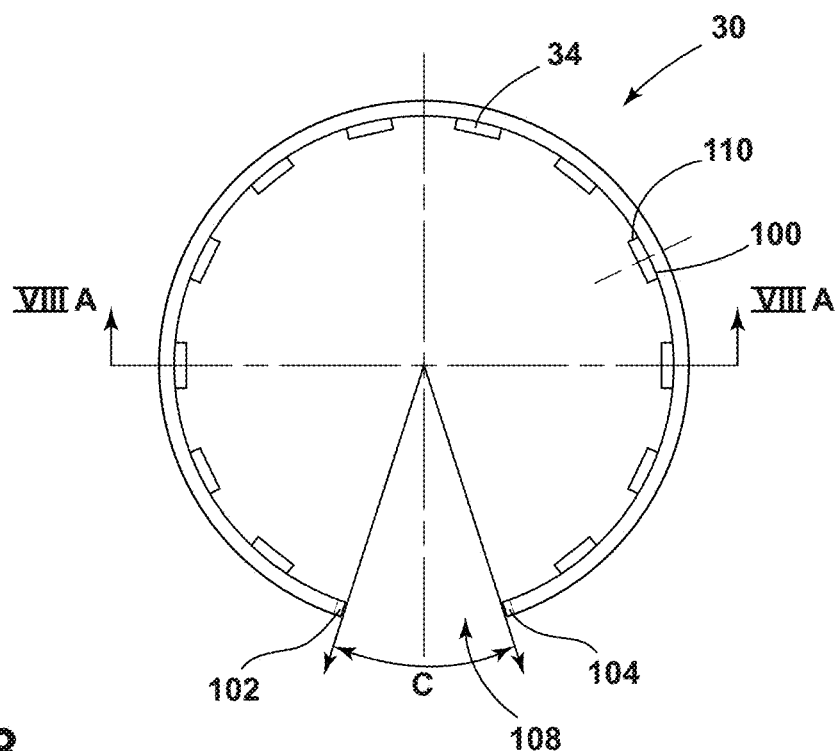
FIG. 8 is a top profile view of the grip ring of FIG. 7.
Figure 8A:
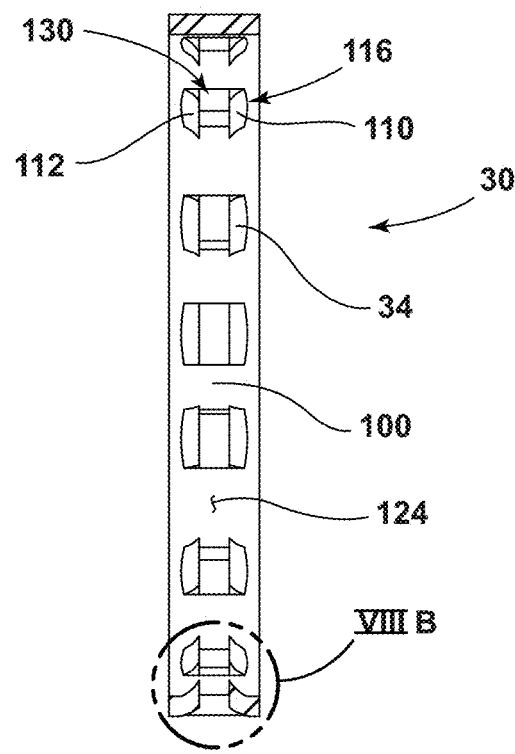
FIG. 8A is a cross-sectional view at line VIIIA-VIIIA of the grip ring of FIG. 8.
Figure 8B:
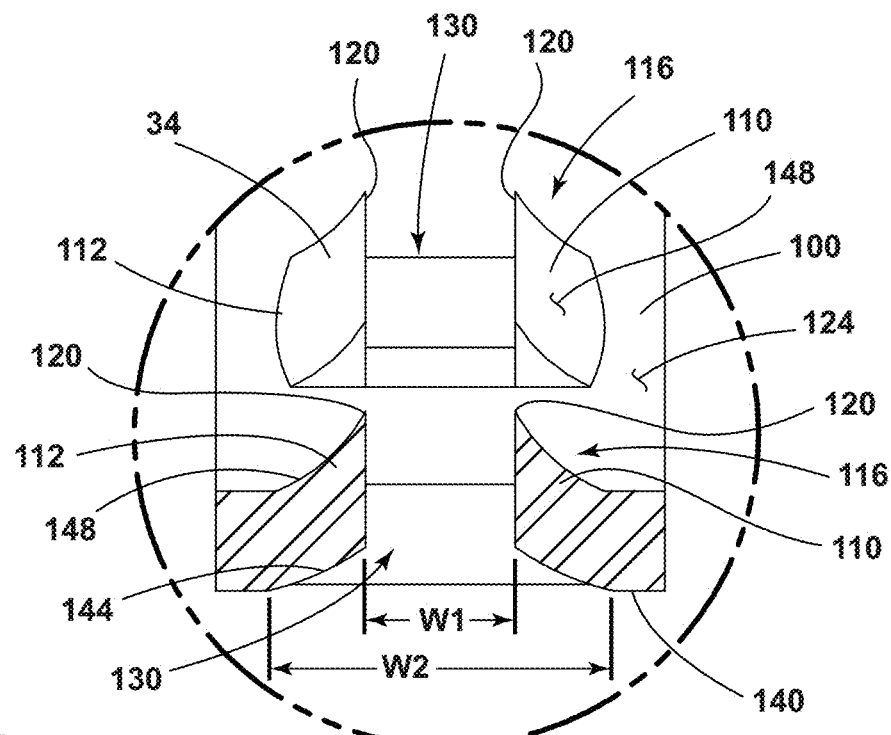
FIG. 8B is an expanded view of a pair of teeth of the grip ring of FIG. 8A.

Referring now to FIGS. 7-8B, a first exemplary configuration for the grip ring 30 is shown having a first pattern for the plurality of opposing teeth 34. The plurality of opposing teeth 34 includes the pairs of opposing teeth 116 circumferentially spaced about body 100 of the grip ring 30. Each tooth of the first row of teeth 110 is aligned with the respective tooth of the second row of teeth 112, as shown in FIG. 8. Each of the pairs of opposing teeth 116 is evenly spaced from the neighboring pairs of teeth 116.

As shown in FIGS. 7 and 8A, a plurality of openings 130 is defined spaced about the body 100 of the grip ring 30. The spacing of the plurality of openings 130 is the same as the spacing between each of the pairs of opposing teeth 116. The number of openings 130 is half the number of the plurality of opposing teeth 34. Each of the plurality of openings 130 is at least partially framed by a respective pair of teeth 116. According to some examples, each of the openings 130 may be shaped as a square. Alternatively, each of the openings 130 may be shaped as a circle, triangle, rectangle, or any other higher-order polygon. Where each of the plurality of openings 130 is shaped with parallel linear edges (i.e., square, rectangle, etc.), one of the first row of teeth 110 extends from a first edge 134 of the respective opening 130 while one of the second row of teeth 112 extends from a second edge 136 of the respective opening 130. The first edge 134 of the respective opening 130 may be opposed to the second edge 136 of the respective opening 130 such that the first and second rows of teeth 110, 112 are substantially parallel. In other examples, the first and second edges 134, 136 may be at least partially curved.

Referring now to FIGS. 8A and 8B, according to various examples, the first and second rows of teeth 110, 112 may be integrally formed with the body 100 of the grip ring 30. Each of the plurality of opposing teeth 34 may extend upward and inward from an outer surface 140 of the body 100 of the grip ring 30, as best shown in FIG. 8B. An inner width W1 of each of the plurality of openings 130 may be less than an outer width W2 of each of the plurality of openings 130. A bottom surface 144 of each of the plurality of opposing teeth 34 may be substantially non-linear and may have a slope configured to mirror a slope of an upper surface 148 of each of the plurality of opposing teeth 34. In other examples, the inner width W1 and the outer width W2 of each of the plurality of openings 130 may be substantially the same.

Figure 8C:
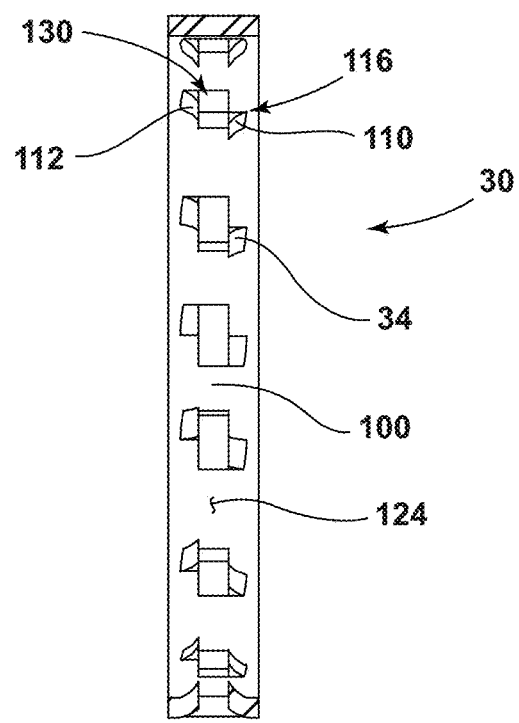
FIG. 8C is a cross-sectional view of a grip ring, according to various examples.

Referring now to FIG. 8C, the grip ring 30 is shown having the plurality of openings 130 spaced about the body 100 of the grip ring 30. Each of the plurality of openings 130 is framed by the respective pair of opposing teeth 116. The plurality of openings 130 may each be elongated such that the first and second rows of teeth 110, 112 are offset. The offset rows of teeth 110, 112 may facilitate formation of a nearly continuous ring of the plurality of teeth 34 that may provide even gripping across the circumference of the pipe 60, as discussed previously with regards to FIG. 6. The continuity of the ring of the plurality of teeth 34 may result in more even distribution of any pressure against the plurality of teeth 34 between the plurality of teeth 34 and about the outer surface of the pipe 60. The continuity of the ring of the plurality of teeth 34 may further improve gripping of the pipe 60 that has poor surface straightness and/or poor roundness.

Figure 9:
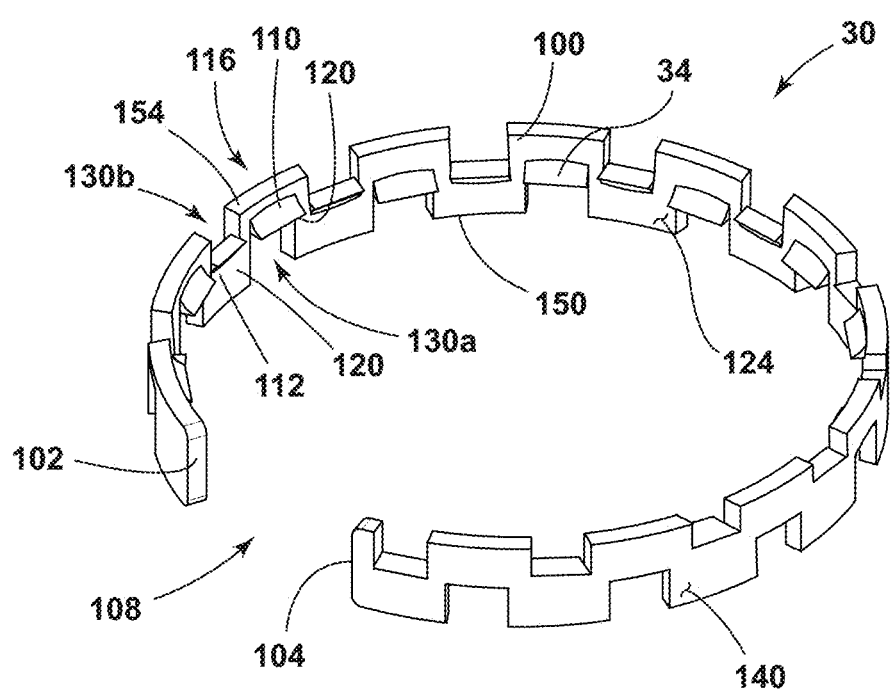
FIG. 9 is a perspective view of a grip ring, according to various examples.
Figure 10:
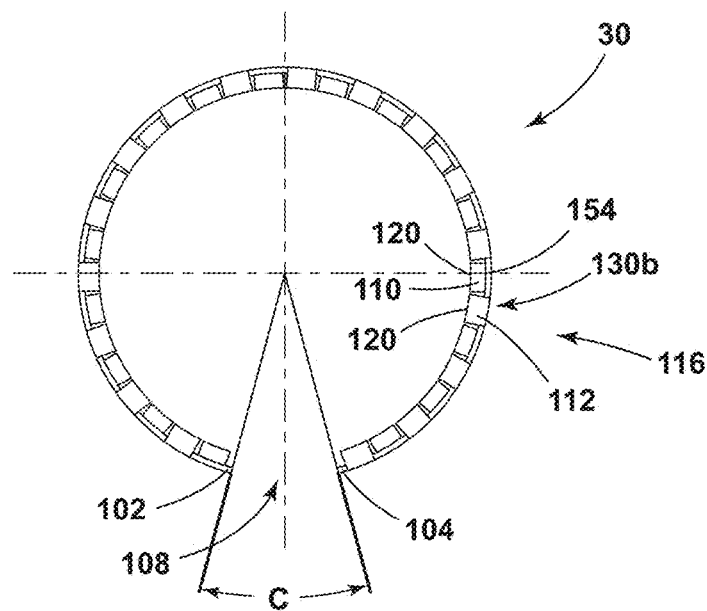
FIG. 10 is a top profile view of the grip ring of FIG. 9.
Figure 10A:
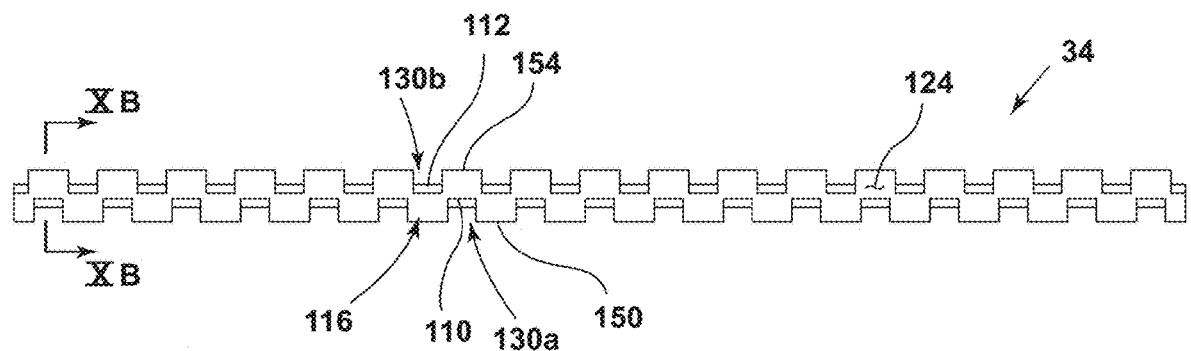
FIG. 10A is a side view of the pattern of teeth of the grip ring of FIG. 9.
Figure 10B:
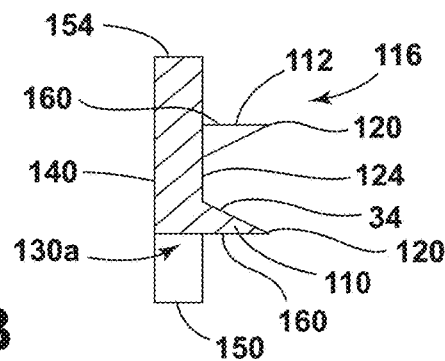
FIG. 10B is a side profile view of a pair of teeth of the pattern of teeth of the grip ring of FIG. 9.

Referring now to FIGS. 9-10B, a second exemplary configuration for the grip ring 30 is shown having a second pattern for the plurality of opposing teeth 34. The plurality of opposing teeth 34 includes the pairs of opposing teeth 116 offset and circumferentially spaced about the body 100 of the grip ring 30. The first row of teeth 110 is offset respective to the second row of teeth 112. As discussed above, the offset rows of teeth 110, 112 may facilitate formation of a nearly continuous ring of the plurality of teeth 34 that may provide even gripping across the circumference of the pipe 60, as discussed previously with regards to FIG. 6. The continuity of the ring of the plurality of teeth 34 may result in more even distribution of any pressure against the plurality of teeth 34 between the plurality of teeth 34 and about the outer surface of the pipe 60. The continuity of the ring of the plurality of teeth 34 may further improve gripping of a pipe 60 that has poor surface straightness and/or poor roundness.

Each of the plurality of opposing teeth 34 is positioned proximate one of the plurality of openings 130. The number of openings 130 is the same as the number of teeth 34. The plurality of openings 130 includes first openings 130a and second openings 130b. Each of the first openings 130a is at least partially defined by one of the first row of teeth 110 and are defined proximate a first edge 150 of the body 100 of the grip ring 30. Each of the second openings 130b is at least partially defined by one of the second row of teeth 112 and are defined proximate a second edge 154 of the body 100 of the grip ring 30. According to various examples, the first and second openings 130a, 130b may be substantially square or rectangular. In other examples, the first and second openings 130a, 130b may be circular, oblong, triangular, or shaped as any other higher-order polygon.

Referring now to FIGS. 10A and 10B, according to various examples, each of the first and second rows of teeth 110, 112 may be integrally formed with the body 100 of the grip ring 30. Each of the plurality of opposing teeth 34 may extend inward from the outer surface 140 of the body 100 of the grip ring 30, as best shown in FIG. 10B. An outer surface 160 of each of the plurality of opposing teeth 34 may be substantially linear and may be oriented to be perpendicular to the inner surface 124 of the body 100 of the grip ring 30 and parallel to the first and second edges 150, 154 of the body 100 of the grip ring 30. In other examples, the outer surface 160 of each of the plurality of opposing teeth 34 may be at least partially non-linear.

Referring again to FIGS. 1-6, the sealing element 38 is positioned within the receiving space 94, 294, 394 of the receiving device 14, 214, 314. The sealing element 38 may be positioned proximate the first shoulder 22, 222, 322, according to various examples. In other examples, the sealing element 38 may be positioned to abut the first shoulder 22, 222, 322. The sealing element 38 may be positioned between the first shoulder 22, 222, 322 and the grip ring 30. The sealing element 38 may be formed of an elastomeric polymer and may be configured to provide a seal about the pipe 60 when the pipe 60 is positioned with the receiving device 14, 214, 314.

Figure 11:
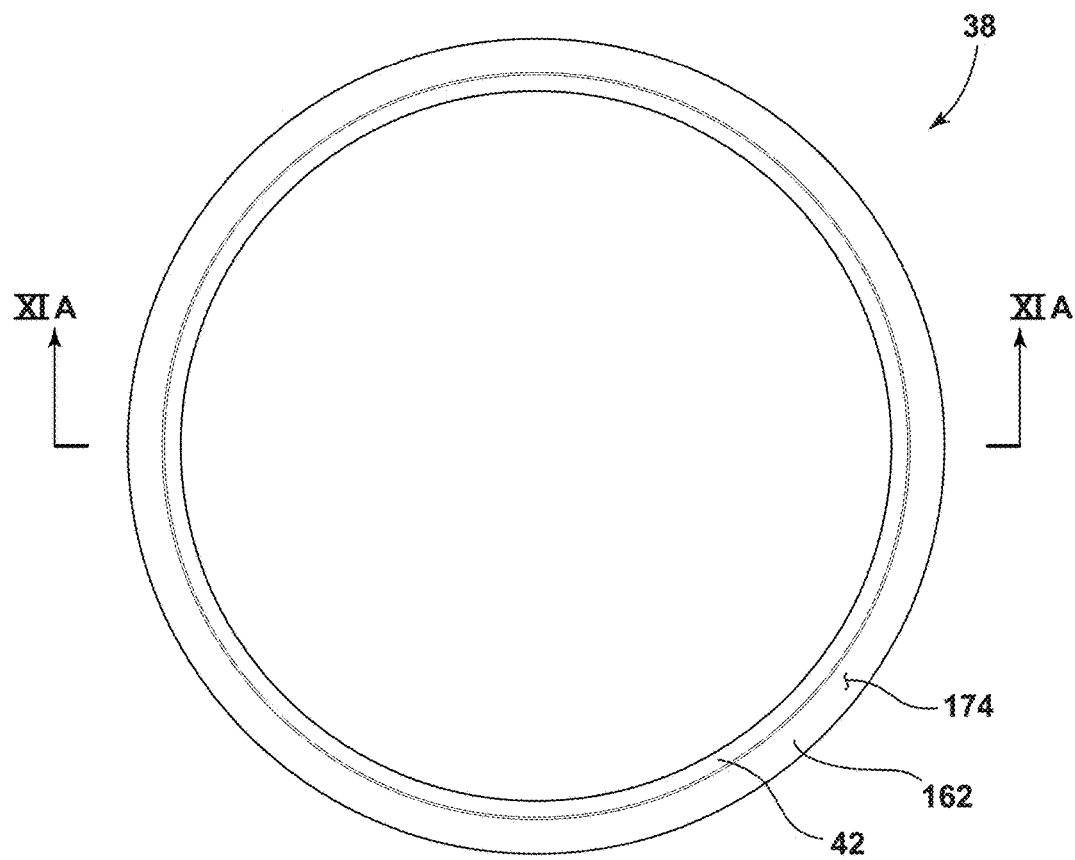
FIG. 11 is a top profile view of a sealing element, according to various examples.
Figure 11A:
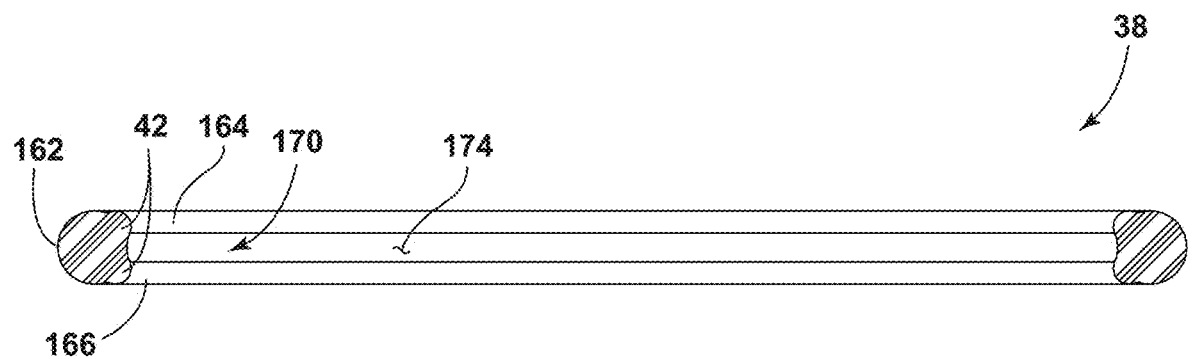
FIG. 11A is a cross-sectional view taken at line XIA-XIA of the sealing element of FIG. 11.

Referring now to FIGS. 11 and 11A, the sealing element 38 may include a body portion 162 integrally formed with one or more lobes 42 (e.g., one lobe 42, two lobes 42, three lobes 42, etc.). The one or more lobes 42 may be a pair of lobes 42 as shown in exemplary form in FIGS. 11 and 11A, according to various examples. The pair of lobes 42 may include a first lobe 164 and a second lobe 166. The first and second lobes 164, 166 may define a space 170 extending circumferentially about the sealing element 38. The first and second lobes 164, 166 may be generally curved such that the sealing element 38 is substantially non-linear across an outer surface 174 of the sealing element 38.

As shown in FIGS. 2, 4, and 5, each of the first and second lobes 164, 166 may be positioned to be substantially in contact with one of the first shoulder 22, 222, 322 and the separator ring 46. The separator ring 46 may be positioned within the receiving space 94, 294, 394 of the receiving device 14, 214, 314 and may be positioned between the sealing element 38 and the grip ring 30 to prevent inadvertent contact between the plurality of opposing teeth 34 of the grip ring and the sealing element 38. Such contact may impact the sealing properties of the sealing element 38.

Figure 12:
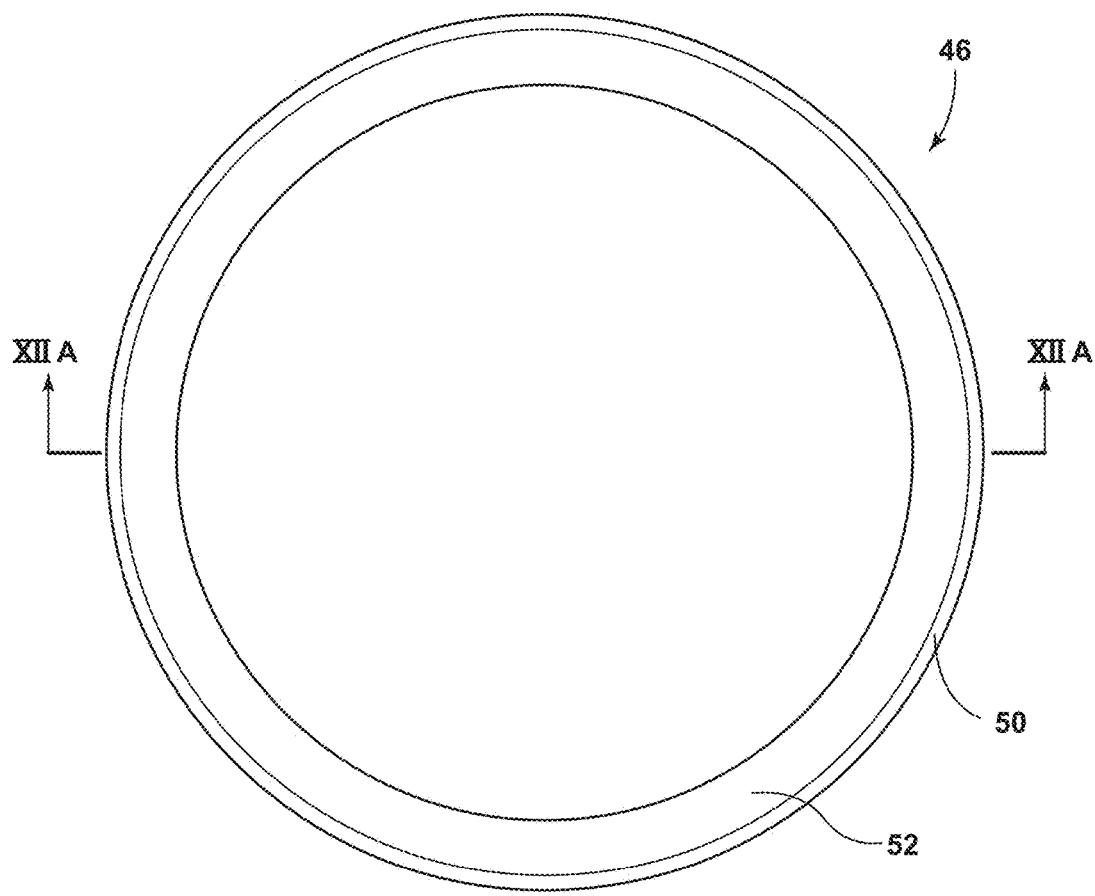
FIG. 12 is a top profile view of a separator ring, according to various examples.
Figure 12A:
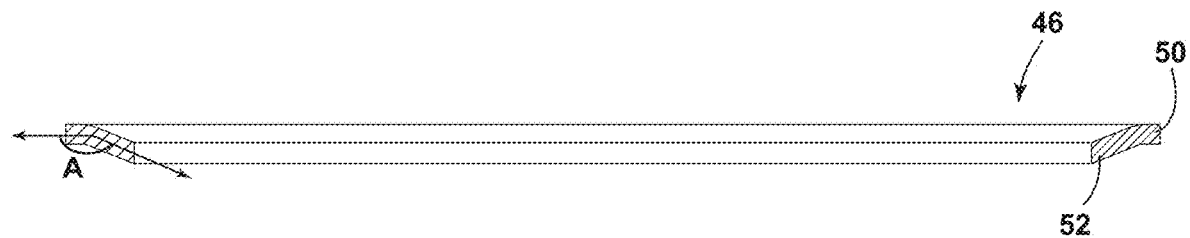
FIG. 12A is a cross-sectional view taken at line XIIA-XIIA of the separator ring of FIG. 12.

Referring now to FIGS. 12 and 12A, the separator ring 46 may include the base portion 50 and the angled portion 52. The angled portion 52 may extend away from the base portion 50 toward the sealing element 38 and the first shoulder 22, 222, 322 of the receiving device 14, 214, 314 (FIGS. 2, 4, and 5). The angled portion 52 may be positioned at an angle A relative to the base portion 50 of the separator ring 46. The angle may be about 125° to about 175°, about 130° to about 170°, about 140° to about 160°, or any value or range of values therebetween. Like the grip ring 30, the separator ring 46 may be formed of stainless steel metal, or any other metal or material that creates a boundary between the grip ring 30 and the sealing element 38. In some implementations, separator ring 46 may be formed of graphite or a graphite-containing material. Use of graphite in separator ring 46 can provide a heat resilient seal in addition to the lower temperature seal offered by the sealing element 38 (see FIGS. 2 and 4). For example, a graphite-containing separator ring 46 can make the press fitting assembly 10 suitable for gas applications as a graphite seal can survive a 1000 degree F. heat test. Further, in some implementations of the press fitting assembly 10 shown in FIGS. 2 and 4, a separate graphite-containing separator ring may be employed in addition to the separator ring 46, either upstream or downstream from the separator ring 46. In such instances, the additional graphite-containing separator ring may have a cross-sectional shape as the separator ring 46 shown in FIGS. 2 and 4 or it may have a substantially square, circular, or elliptical cross-sectional shape.

As shown in FIGS. 2, 4, and 5, when the separator ring 46 is positioned within the receiving space 94, 294, 394 of the receiving device 14, 214, 314, the base portion 50 may be positioned to abut at least one of the grip ring 30 and the sealing element 38. In various examples, the base portion 50 may be positioned between the grip ring 30 and the sealing element 38 such that the base portion 50 is in contact with the grip ring 30 and the sealing element 38. The angled portion 52 may be positioned to abut the other of the grip ring 30 and the sealing element 38. For example, the base portion 50 may be positioned such that the base portion 50 is perpendicular to the continuous stop 26. The angled portion 52 may extend away from the base portion 50 towards the sealing element 38 and the first shoulder 22, 222, 322. One of the plurality of lobes 42 is substantially encompassed by the angle between the base portion 50 and the angled portion 52. In another example, the base portion 50 may be positioned such that the base portion 50 is perpendicular to the continuous stop 26, 226, 326. The angled portion 52 may extend away from the base portion 50 towards the grip ring 30 and the continuous stop 26. The angled portion 52 may substantially shield one of the first and second rows of teeth 110, 112 of the plurality of opposing teeth 34 of the grip ring 30. The angled portion 52 prevents contact between the sealing element 38 and the plurality of opposing teeth 34, protecting the sealing element 38 from the plurality of opposing teeth 34 and preserving the seal between the pipe 60 and the receiving device 14, 214, 314 (see FIG. 6).

It will be understood that the coupling 12, the adapter 212, and the valve 312 illustrated in FIGS. 1-5 are merely exemplary. The use of the grip ring 30, the sealing element 38, and the separator ring 46 may be used with any other piping component without departing from the scope of the present disclosure. For example, the grip ring 30, the sealing element 38, and the separator ring 46 may be used with any piping components having at least one open end and designed to be joined with a pipe, such as, but not limited to, connection ends, construction bodies, flow control members, and/or article accessories.

According to a first aspect, a press fitting assembly is provided that includes: a piping component including a receiving device which includes an open end and a shoulder, the open end comprising a continuous stop. The press fitting assembly also includes a grip ring positioned within the receiving device abutting the continuous stop, wherein the grip ring comprises a plurality of opposing teeth; a sealing element positioned within the receiving device and abutting the shoulder, wherein the sealing element comprises at least one lobe; and a separator ring positioned within the receiving device between the sealing element and the grip ring, wherein the separator ring comprises a base portion and an angled portion. Further, the angled portion is angled toward the sealing element and the shoulder.

According to a second aspect, the press fitting assembly of the first aspect is provided, and the plurality of opposing teeth includes pairs of opposing teeth circumferentially spaced about the grip ring.

According to a third aspect, the press fitting assembly of the first aspect is provided, and the plurality of opposing teeth includes pairs of opposing, offset teeth circumferentially spaced about the grip ring.

According to a fourth aspect, the press fitting assembly of any one of the first through third aspects is provided, and the pairs of opposing teeth of the grip ring define a triangular cross-section.

According to a fifth aspect, the press fitting assembly of any one of the first through fourth aspects is provided, and the separator ring includes a graphite material.

According to a sixth aspect, the press fitting assembly of any one of the first through fifth aspects is provided, and the sealing element includes a body portion. The at least one lobe is a pair of lobes. Each lobe is substantially in contact with one of the separator ring and the shoulder.

According to a seventh aspect, the press fitting assembly of any one of the first through sixth aspects is provided, and the sealing element is formed of an elastomeric polymer.

According to an eighth aspect, the press fitting assembly of any one of the first through seventh aspects is provided, and the angled portion of the separator ring is positioned at an angle relative to the base portion.

According to a ninth aspect, the press fitting assembly of the eighth aspect is provided, and the angle measures about 140° to about 160°.

According to a tenth aspect, the press fitting assembly of any one of the first through ninth aspects is provided, and the press fitting assembly further includes a pipe positioned within the receiving device such that the plurality of opposing teeth of the grip ring is positioned toward the pipe.

According to an eleventh aspect, a press fitting assembly is provided that includes: a piping component including a receiving device which comprises an open end and first and second shoulders, wherein the open end comprises a continuous stop with the continuous stop and the first shoulder forming a receiving space; a grip ring positioned within the receiving space and proximate the continuous stop, wherein the grip ring comprises a plurality of opposing teeth, and each of the plurality of opposing teeth has an angled tip; a sealing element positioned within the receiving space and proximate the grip ring, the sealing element comprising at least one lobe; and a separator ring positioned between the sealing element and the grip ring. The receiving device and the second shoulder are configured to receive a pipe which abuts against the second shoulder.

According to a twelfth aspect, the press fitting assembly of the eleventh aspect is provided, and the plurality of opposing teeth includes pairs of opposing teeth. Each pair at least partially frames one of a plurality of openings. The number of openings is half the number of teeth.

According to a thirteenth aspect, the press fitting assembly of the eleventh aspect is provided, and the plurality of opposing teeth includes pairs of opposing, offset teeth circumferentially spaced about the grip ring. Each of the plurality of opposing teeth is positioned proximate one of a plurality of openings. The number of openings is the same as the number of teeth.

According to a fourteenth aspect, the press fitting assembly of any one of the eleventh through the thirteenth aspects is provided, and the separator ring includes a first portion and a second portion positioned at an angle relative to the first portion.

According to a fifteenth aspect, the press fitting assembly of the fourteenth aspect is provided, and the angle of the second portion is between about 130° to about 170°. The second portion is positioned proximate the grip ring. The first portion is positioned proximate the sealing element.

According to a sixteenth aspect, a press fitting assembly is provided that includes: a piping component including a receiving device which comprises an open end and a shoulder; a grip ring positioned within the receiving device between the open end and the shoulder, the grip ring comprising a plurality of teeth extending toward a center of the grip ring, wherein the plurality of teeth of the grip ring are arranged in a first row of teeth and a second row of teeth; a sealing element positioned proximate the grip ring, wherein the sealing element comprises at least one lobe; and a separator ring positioned between the sealing element and the grip ring, wherein the separator ring includes a first portion and a second portion positioned at an angle between about 125° to about 175° relative to the first portion. Further, the receiving device is configured to receive a pipe.

According to a seventeenth aspect, the press fitting assembly of the sixteenth aspect is provided, and the first portion of the separator ring is positioned to abut one of the sealing element and the grip ring. The second portion is positioned to abut the other of the sealing element and the grip ring.

According to an eighteenth aspect, the press fitting assembly of the sixteenth aspect is provided, and the first row of teeth is offset respective to the second row of teeth.

According to a nineteenth aspect, the press fitting assembly of any one of the sixteenth through eighteenth aspects is provided, and the first row of teeth is aligned with the second row of teeth.

According to a twentieth aspect, the press fitting assembly of the sixteenth aspect or the seventeenth aspect is provided, and the receiving device has a continuous stop about the periphery of the open end. The grip ring is positioned to abut the continuous stop.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents. Moreover, while some of the illustrated couplings 12, 212, 312 are shown with both ends having a press-fit connection, any combination of connections can be used. For example, without limitation, the connections could be press x push, press x FIP (Female Iron Pipe), press x PEX, press x solder, press x MIP (Male Iron Pipe), etc. The coupling can also include a variety of valves, no valve, drains, plugs, elbows, tees, and transitions, including size transitions.

What is claimed is:

1. A press fitting assembly, comprising:
   a piping component including a receiving device, the receiving device comprising an open end and a shoulder, wherein the open end comprises a continuous stop;
   a grip ring positioned within the receiving device abutting the continuous stop, wherein the grip ring comprises pairs of opposing teeth, each pair at least partially framing one of a plurality of openings, the number of openings being half the number of teeth;
   a sealing element positioned within the receiving device and abutting the shoulder, wherein the sealing element comprises at least one lobe; and
   a separator ring positioned within the receiving device between the sealing element and the grip ring, wherein the separator ring comprises a base portion and an angled portion, and further wherein the angled portion is angled toward the sealing element and the shoulder.

2. The press fitting assembly of claim 1, wherein the pairs of opposing teeth are circumferentially spaced about the grip ring.

3. The press fitting assembly of claim 1, wherein the pairs of opposing teeth each include offset teeth, the pairs of opposing teeth are circumferentially spaced about the grip ring.

4. The press fitting assembly of claim 3, wherein the pairs of opposing teeth of the grip ring define a triangular cross-section.

5. The press fitting assembly of claim 1, wherein the separator ring includes a graphite material.

6. The press fitting assembly of claim 1, wherein the sealing element comprises a body portion, and further wherein the at least one lobe is a pair of lobes, each lobe substantially in contact with one of the separator ring and the shoulder.

7. The press fitting assembly of claim 1, wherein the sealing element is formed of an elastomeric polymer.

8. The press fitting assembly of claim 1, wherein the angled portion of the separator ring is positioned at an angle relative to the base portion.

9. The press fitting assembly of claim 8, wherein the angle is about 140° to about 160°.

10. The press fitting assembly of claim 1, further comprising:
a pipe positioned within the receiving device such that the pairs of opposing teeth of the grip ring are positioned toward the pipe.

11. A press fitting assembly comprising:
a piping component including a receiving device, the receiving device comprising an open end and first and second shoulders, wherein the open end comprises a continuous stop, the continuous stop and the first shoulder forming a receiving space;
a grip ring positioned within the receiving space and proximate the continuous stop, wherein the grip ring comprises pairs of opposing teeth, each pair at least partially framing one of a plurality of openings, the number of openings being half the number of teeth, each of the teeth having an angled tip;
a sealing element positioned within the receiving space and proximate the grip ring, wherein the sealing element comprises at least one lobe; and
a separator ring positioned between the sealing element and the grip ring, wherein the receiving device and the second shoulder are configured to receive a pipe, the pipe abutting against the second shoulder.

12. The press fitting assembly of claim 11, wherein the separator ring includes a graphite material.

13. The press fitting assembly of claim 11, wherein the pairs of opposing teeth each include offset teeth, the pairs of opposing teeth circumferentially spaced about the grip ring.

14. The press fitting assembly of claim 11, wherein the separator ring includes a first portion and a second portion positioned at an angle relative to the first portion.

15. The press fitting assembly of claim 14, wherein the angle of the second portion is between about 130° to about 170°, and further wherein the second portion is positioned proximate the grip ring and the first portion is positioned proximate the sealing element.

16. A press fitting assembly comprising:
a piping component including a receiving device, the receiving device comprising an open end and a shoulder;
a grip ring positioned within the receiving device between the open end and the shoulder, the grip ring comprising a plurality of teeth extending toward a center of the grip ring, wherein the teeth of the grip ring are arranged in a first row of teeth and a second row of teeth defining pairs of opposing teeth, each pair at least partially framing one of a plurality of openings, the number of openings being half the number of teeth;
a sealing element positioned proximate the grip ring, wherein the sealing element comprises at least one lobe; and
a separator ring positioned between the sealing element and the grip ring, wherein the separator ring includes a first portion and a second portion positioned at an angle between about 125° to about 175° relative to the first portion, wherein the receiving device is configured to receive a pipe.

17. The press fitting assembly of claim 16, wherein the first portion of the separator ring is positioned to abut one of the sealing element and the grip ring and the second portion is positioned to abut the other of the sealing element and the grip ring.

18. The press fitting assembly of claim 16, wherein the first row of teeth is offset respective to the second row of teeth.

19. The press fitting assembly of claim 16, wherein the first row of teeth is aligned with the second row of teeth.

20. The press fitting assembly of claim 16, wherein the receiving device has a continuous stop about a periphery of the open end, and further wherein the grip ring is positioned to abut the continuous stop.

* * * * *